United States Patent
Naito

(10) Patent No.: US 9,838,565 B2
(45) Date of Patent: Dec. 5, 2017

(54) INFORMATION PROCESSING APPARATUS CAPABLE OF RELIABLY SWITCHING SESSION, METHOD OF CONTROLLING THE SAME, AND STORAGE MEDIUM

(71) Applicant: CANON KABUSHIKI KAISHA, Tokyo (JP)

(72) Inventor: Yosui Naito, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/095,287

(22) Filed: Apr. 11, 2016

(65) Prior Publication Data
US 2016/0309055 A1    Oct. 20, 2016

(30) Foreign Application Priority Data
Apr. 14, 2015    (JP) ................. 2015-082395

(51) Int. Cl.
*H04N 1/333*    (2006.01)
*H04N 1/00*     (2006.01)

(52) U.S. Cl.
CPC ..... *H04N 1/33346* (2013.01); *H04N 1/33376* (2013.01); *H04N 2201/33342* (2013.01)

(58) Field of Classification Search
CPC .............. H04N 1/33346; H04N 1/001; H04N 1/33376; H04N 1/0001; H04N 2201/33342
USPC ........................................ 358/1.15
See application file for complete search history.

(56) References Cited

U.S. PATENT DOCUMENTS

| | | | | |
|---|---|---|---|---|
| 7,894,091 B2 * | 2/2011 | Fujino | ................ | H04N 1/00209 358/1.13 |
| 8,587,801 B2 * | 11/2013 | Fahrenthold | ....... | H04N 1/00209 358/1.15 |
| 8,780,386 B2 * | 7/2014 | Shaheen | ............ | H04N 1/00214 358/1.13 |
| 8,958,098 B2 * | 2/2015 | Sato | ................... | H04N 1/00217 358/1.13 |
| 2009/0153908 A1 * | 6/2009 | Fahrenthold | ....... | H04N 1/00209 358/400 |
| 2010/0053666 A1 * | 3/2010 | Kamiya | ............. | H04N 1/00127 358/1.15 |
| 2011/0109936 A1 * | 5/2011 | Coffee | ............... | H04N 1/00214 358/1.15 |
| 2013/0050755 A1 * | 2/2013 | Nakagawa | ........... | H04N 1/0022 358/1.15 |
| 2013/0051541 A1 * | 2/2013 | Inoue | ................... | H04M 11/066 379/100.01 |

(Continued)

FOREIGN PATENT DOCUMENTS

JP        2007336161 A    12/2007

*Primary Examiner* — Allen H Nguyen
(74) *Attorney, Agent, or Firm* — Rossi, Kimms & McDowell LLP

(57) ABSTRACT

An information processing apparatus capable of reliably switching a session. An IP fax as an information processing apparatus is connected to another IP fax. The IP fax establishes an audio session with the other IP fax. After establishing the audio session, the IP fax receives capability information indicating capabilities of the other IP fax therefrom. After receiving the capability information, the IP fax requests the other IP fax to switch the audio session to a T.38 session. Then, the IP fax switches the audio session to the T.38 session.

20 Claims, 12 Drawing Sheets

(56) References Cited

U.S. PATENT DOCUMENTS

2014/0347701 A1\* 11/2014 Ohara .................. H04N 1/0048
 358/400
2015/0288854 A1\* 10/2015 Hama ................ H04N 1/32782
 358/434

\* cited by examiner

INFORMATION PROCESSING APPARATUS CAPABLE OF RELIABLY SWITCHING SESSION, METHOD OF CONTROLLING THE SAME, AND STORAGE MEDIUM

BACKGROUND OF THE INVENTION

Field of the Invention

The present invention relates to an information processing apparatus that is capable of reliably switching a session, a method of controlling the same, and a storage medium.

Description of the Related Art

Conventionally, there has been known an information processing apparatus that has an IP phone function and an IP fax function (see e.g. Japanese Patent Laid-Open Publication No. 2007-336161). The information processing apparatus disclosed in Japanese Patent Laid-Open Publication No. 2007-336161 is compatible with the communication protocol T.38 recommended by ITU-T that is one sector of International Telecommunication Union, and realizes high-speed fax communication.

The information processing apparatus compatible with the communication protocol T.38 sometimes performs IP fax communication using the IP fax function after the end of IP phone conversation using the IP phone function. In such a case, first, when the user enables the IP phone function of the information processing apparatus to perform IP phone conversation, the information processing apparatus sets a medium type indicating the type of communication to "audio" indicating voice data communication, based on SIP. Note that SIP is an abbreviation of Session Initiation Protocol. The information processing apparatus establishes a session for performing IP phone conversation (hereinafter referred to as the "audio session"). After that, before the IP phone conversation is terminated to start IP fax communication, the information processing apparatus changes the medium type from "audio" to "image" indicating image data communication or "application" indicating various data communication, based on SIP. By changing the medium type as described above, the information processing apparatus establishes a session for performing IP fax communication (hereinafter referred to as the "T.38 session"). To perform switching of a session, although not specified as a protocol of SIP, it is regarded as a de facto standard that a signal requesting switching of the session (hereinafter referred to as the "Re-INVITE signal") is transmitted from an information processing apparatus at a receiving end of an IP phone call (hereinafter referred to as the "receiving-end apparatus"), and the transmitted Re-INVITE signal is received by an information processing apparatus at a transmitting end of the IP phone call (hereinafter referred to as the "transmitting-end apparatus").

Incidentally, conventionally, the IP fax function of an information processing apparatus compatible with the communication protocol T.38 has been used mainly over an intranet, but in recent years, the IP fax function is used also over a public IP network, such as the NGN (Next Generation Network).

However, concerning an apparatus that transmits a Re-INVITE signal, there is neither requirements stipulated in the NGN nor a de facto standard. Therefore, there is a case where a receiving-end apparatus and a transmitting-end apparatus simultaneously transmit respective Re-INVITE signals. In this case, the respective Re-INVITE signals transmitted from the transmitting-end and receiving-end apparatuses collide with each other, which makes it impossible for each apparatus to receive the Re-INVITE signal intended therefor. As a consequence, switching of the audio session to the T.38 session sometimes fails.

Further, when the transmitting-end apparatus receives a Re-INVITE signal from the receiving-end apparatus during IP phone conversation, the session cannot be immediately switched because the transmitting-end apparatus is performing IP phone conversation. On the other hand, when the Re-INVITE signal is received from the receiving-end apparatus, if the transmitting-end apparatus sends a response to the effect that the session cannot be switched, to the receiving-end apparatus, this may cause a problem that it is impossible thereafter to switch the session between the transmitting-end apparatus and the receiving-end apparatus. In short, it is impossible to reliably switch the session.

SUMMARY OF THE INVENTION

The present invention provides an information processing apparatus that is capable of reliably switching a session, a method of controlling the same, and a storage medium.

In a first aspect of the present invention, there is provided an information processing apparatus comprising an establishing unit configured to establish a first session with another information processing apparatus, a reception unit configured to receive capability information indicating capabilities of the other information processing apparatus from the other information processing apparatus, after the establishing unit establishes the first session, a request unit configured to request the other information processing apparatus to switch the first session to a second session, after the reception unit receives the capability information, and a switching unit configured to switch the first session to the second session after the request unit requests the other information processing apparatus to switch the first session to the second session.

In a second aspect of the present invention, there is provided a method of controlling an information processing apparatus, comprising establishing a first session with another information processing apparatus, receiving capability information indicating capabilities of the other information processing apparatus from the other information processing apparatus, after establishing the first session, requesting the other information processing apparatus to switch the first session to a second session, after receiving the capability information, and switching the first session to the second session after requesting the other information processing apparatus to switch the first session to the second session.

In a third aspect of the present invention, there is provided a non-transitory computer-readable storage medium storing a computer-executable control program for causing a computer to execute a method of controlling an information processing apparatus, wherein the method comprises establishing a first session with another information processing apparatus, receiving capability information indicating capabilities of the other information processing apparatus from the other information processing apparatus, after establishing the first session, requesting the other information processing apparatus to switch the first session to a second session, after receiving the capability information, and switching the first session to the second session after requesting the other information processing apparatus to switch the first session to the second session.

According to the present invention, it is possible to reliably switch a session.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
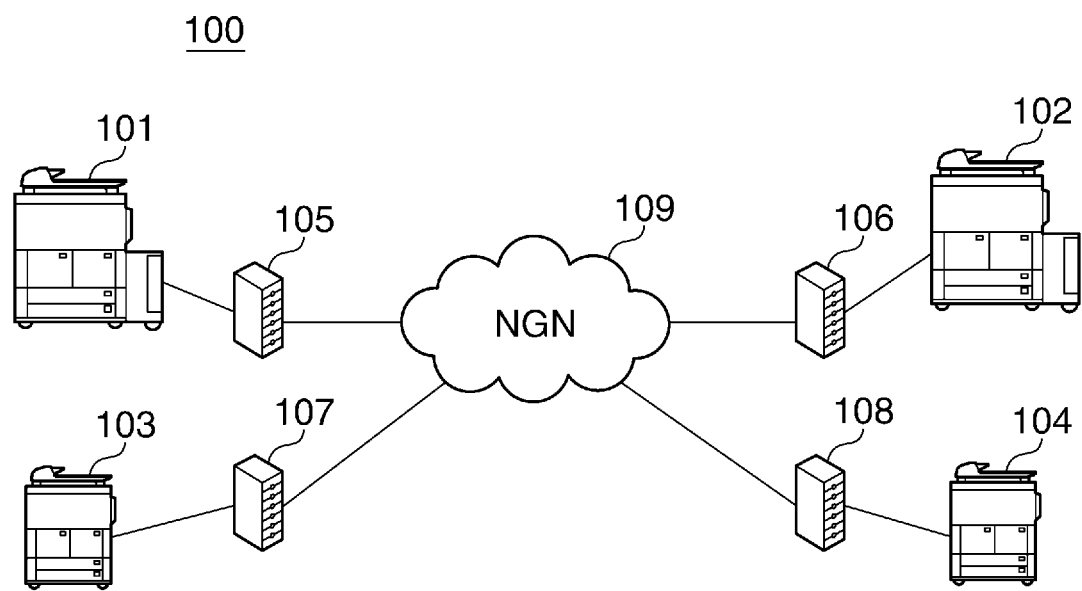
FIG. 1 is a schematic diagram of an information processing system including an information processing apparatus according to a first embodiment of the present invention.

FIG. 1 is a schematic diagram of an information processing system 100 including an information processing apparatus according to a first embodiment of the present invention.

The information processing system 100 shown in FIG. 1 includes IP faxes 101 to 104 as information processing apparatuses, HGWs (Home Gateways) 105 to 108, and an NGN 109. The HGWs 105 to 108 are connected to the IP faxes 101 to 104, respectively, and are connected to the NGN 109 which is a public IP network. Therefore, the IP faxes 101 to 104 are interconnected via the NGN 109.

The IP faxes 101 to 104 each have an IP phone function and an IP fax function. The IP faxes 101 and 102 are each capable of transmitting a Re-INVITE signal. Further, the IP faxes 101 and 102 are each capable of transmitting a DIS signal notifying that the IP faxes 101 and 102 are IAFDs (Internet Aware Fax Devices) compatible with the communication protocol T.38. Further, the IP faxes 101 and 102 each have a manual fax reception function for receiving a fax when an instruction for fax reception is received from a user, and a manual fax transmission function for transmitting a fax when an instruction for fax transmission is received from a user. The IP fax 103 has the manual fax reception function and the manual fax transmission function, similarly to the IP faxes 101 and 102, but is not capable of transmitting a Re-INVITE signal. The IP fax 104 has the manual fax reception function and the manual fax transmission function, similarly to the IP faxes 101 and 102, and when the IP fax 104 receives an instruction for executing manual fax reception or manual fax transmission, the IP fax 104 immediately transmits a Re-INVITE signal.

Figure 2:
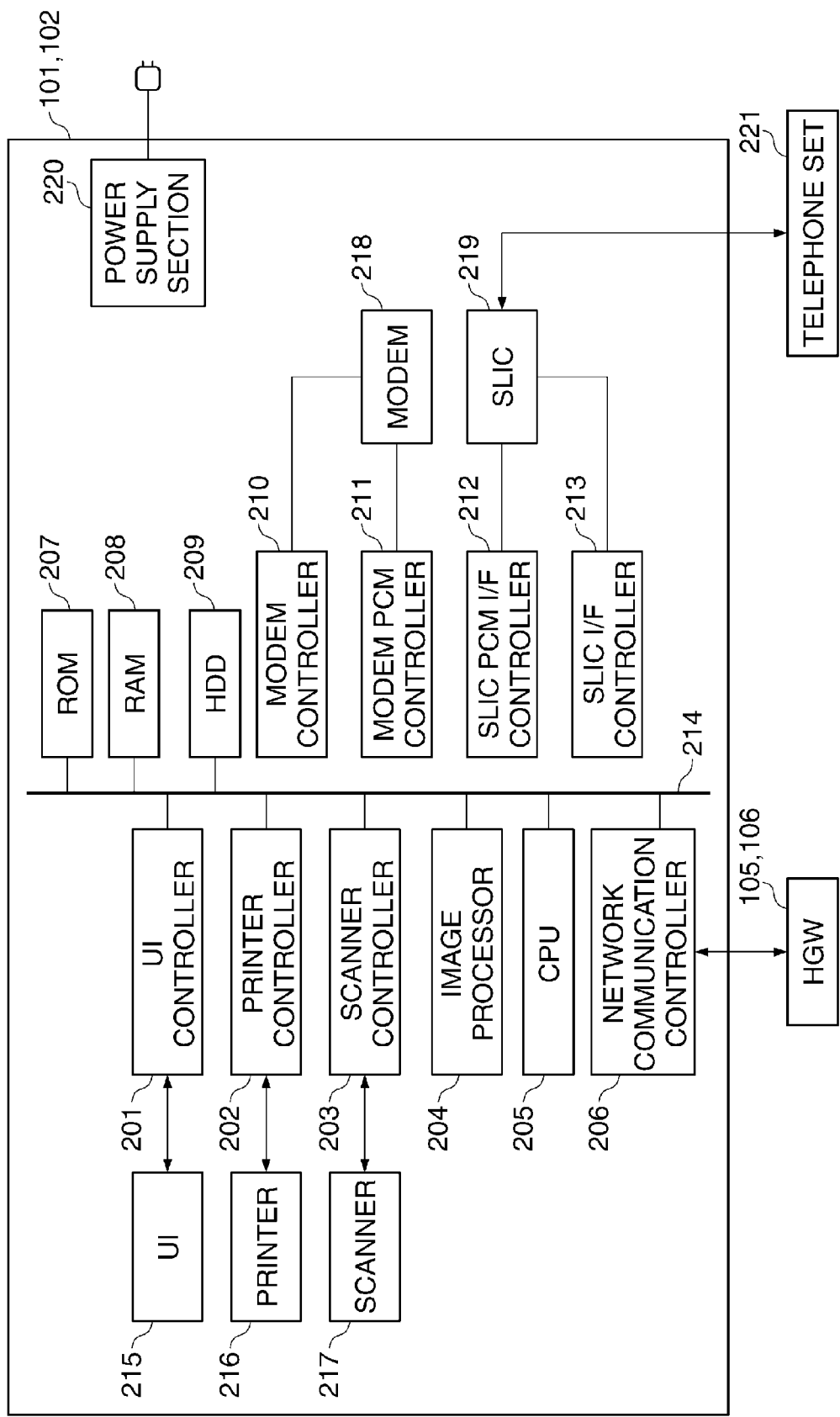
FIG. 2 is a schematic block diagram of the internal components of each of IP faxes appearing in FIG. 1.

FIG. 2 is a schematic block diagram of the internal components of each of the IP faxes 101 and 102 appearing in FIG. 1.

The IP faxes 101 and 102, shown in FIG. 2, each include a UI (User Interface) controller 201, a printer controller 202, a scanner controller 203, an image processor 204, a CPU 205, and a network communication controller 206. Further, the IP faxes 101 and 102 each include a ROM 207, a RAM 208, an HDD 209, a modem controller 210, a modem PCM controller 211, an SLIC PCM interface controller 212, and an SLIC interface controller 213. These components are interconnected via a bus 214.

Further, the IP faxes 101 and 102 each include a user interface 215, a printer 216, a scanner 217, a modem 218, an SLIC (Subscriber Line Interface Circuit) 219, and a power supply section 220. The user interface 215, the printer 216, and the scanner 217 are connected to the UI controller 201, the printer controller 202, and the scanner controller 203, respectively. The modem 218 is connected to the modem controller 210 and the modem PCM controller 211, and the SLIC 219 is connected to the SLIC PCM interface controller 212 and the SLIC interface controller 213. Further, the network communication controller 206 is connected to the HGW 105 or 106, and the SLIC 219 is connected to a telephone set 221.

The UI controller 201 controls the user interface 215 to display various information on the user interface 215, or receives a user's instruction input via the user interface 215. The printer controller 202 controls the printer 216, and the printer 216 prints e.g. image data generated by the scanner 217 on a recording medium. The scanner controller 203 controls the scanner 217, and the scanner 217 reads an original, and generates image data. The image processor 204 performs image processing, such as expansion/compression and rotation, on the generated image data. The CPU 205 controls the IP fax 101 or 102 by executing programs stored in the ROM 207 or the HDD 209. The RAM 208 is used as a work memory for the CPU 205. The HDD 209 is a nonvolatile storage device that stores various programs and various data.

The network communication controller 206 transmits or receives various data to or from an apparatus, such as the IP fax 103 or 104, which is connected to the NGN 109 via the HGW 105 or 106. Further, when the received data is IP packet data compatible with TCP, UDP, RTP or a like other protocol, the network communication controller 206 analyzes the received IP packet data. Note that TCP is an abbreviation of Transmission Control Protocol, and UDP is an abbreviation of User Datagram Protocol. Further, RTP is an abbreviation of Real-time Transport Protocol. The analyzed IP packet data is stored in the RAM 208 or the HDD 209.

The modem 218 performs digital modulation on a digital signal to form an analog signal, for transmission of the analog signal via the modem controller 210, or performs demodulation on an analog signal to form a digital signal, for reception of the digital signal via the modem controller 210. Further, the modem 218 incorporates a voice codec that processes a received voice signal to thereby generate voice data. The voice codec converts an analog signal received by the modem 218 to digital data (hereinafter referred to as the "PCM data") by the PCM (Pulse Code Modulation) method. The converted PCM data is transmitted to the HGW 105 or 106 via the modem PCM controller 211 and the network communication controller 206. Further, the voice codec converts PCM data received by the modem 218 via the HGW 105 or 106, the network communication controller 206, and the modem PCM controller 211, to a voice signal.

The SLIC 219 converts an analog voice signal received via a microphone (not shown) provided in the telephone set 221 to a digital voice signal, and converts the digital voice signal to PCM data. The converted PCM data is transmitted to the HGW 105 or 106 via the SLIC PCM interface controller 212 and the network communication controller 206. Further, the SLIC 219 receives PCM data via the HGW 105 or 106, the network communication controller 206, and the SLIC PCM interface controller 212. The SLIC 219 converts the received PCM data to a digital voice signal, and converts the digital voice signal to an analog voice signal. The converted analog voice signal is transmitted to the telephone set 221, and a voice corresponding to the analog voice signal is output from a loudspeaker (not shown) provided in the telephone set 221. That is, the telephone set 221 can be connected to the IP network by being connected to the SLIC 219 without via an analog telephone line. Further, the SLIC 219 detects an off-hook state of the telephone set 221, and transmits a signal for calling the telephone set 221.

Figure 3:
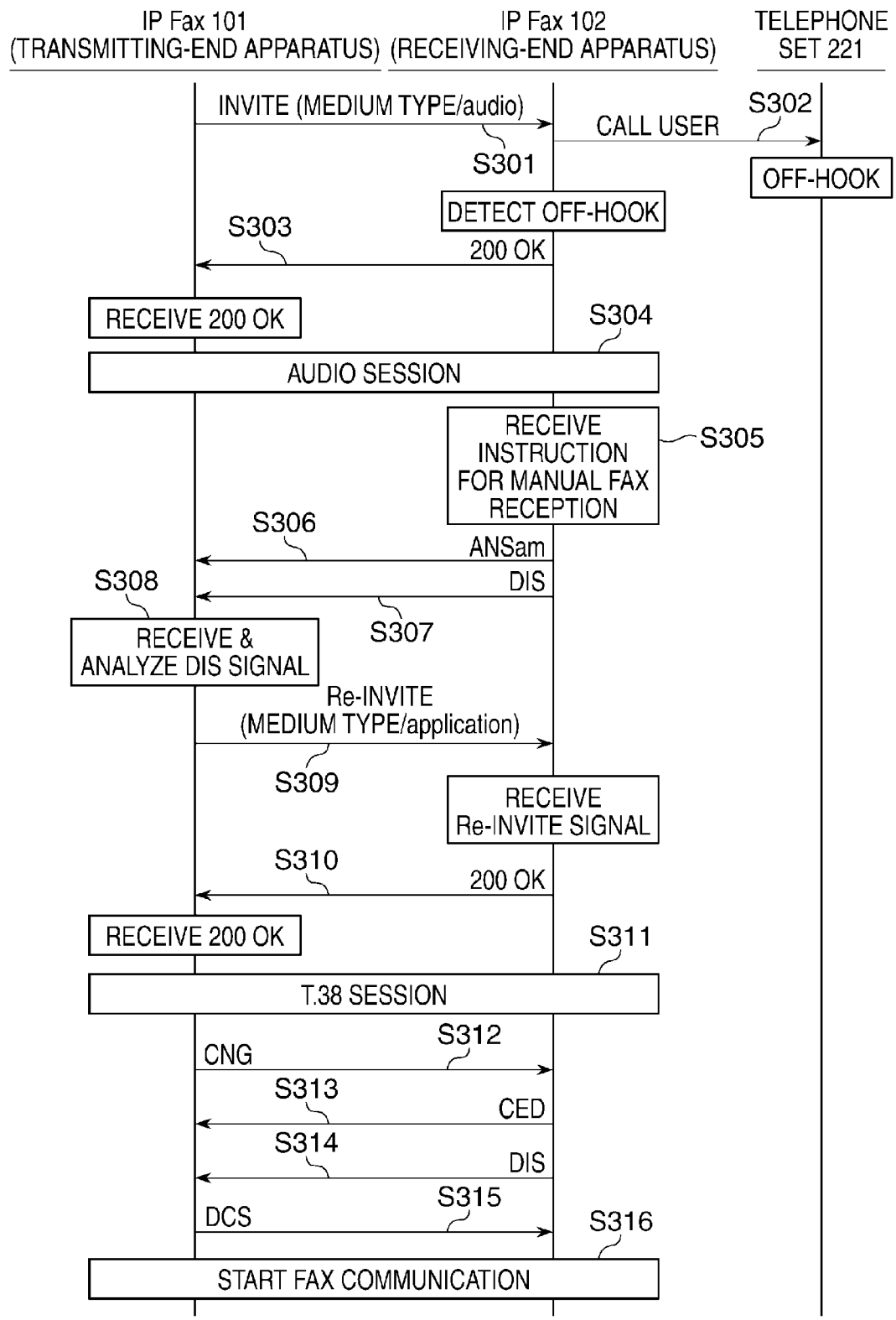
FIG. 3 is a sequence diagram of a first session switching process performed between the IP faxes.
Figure 4:
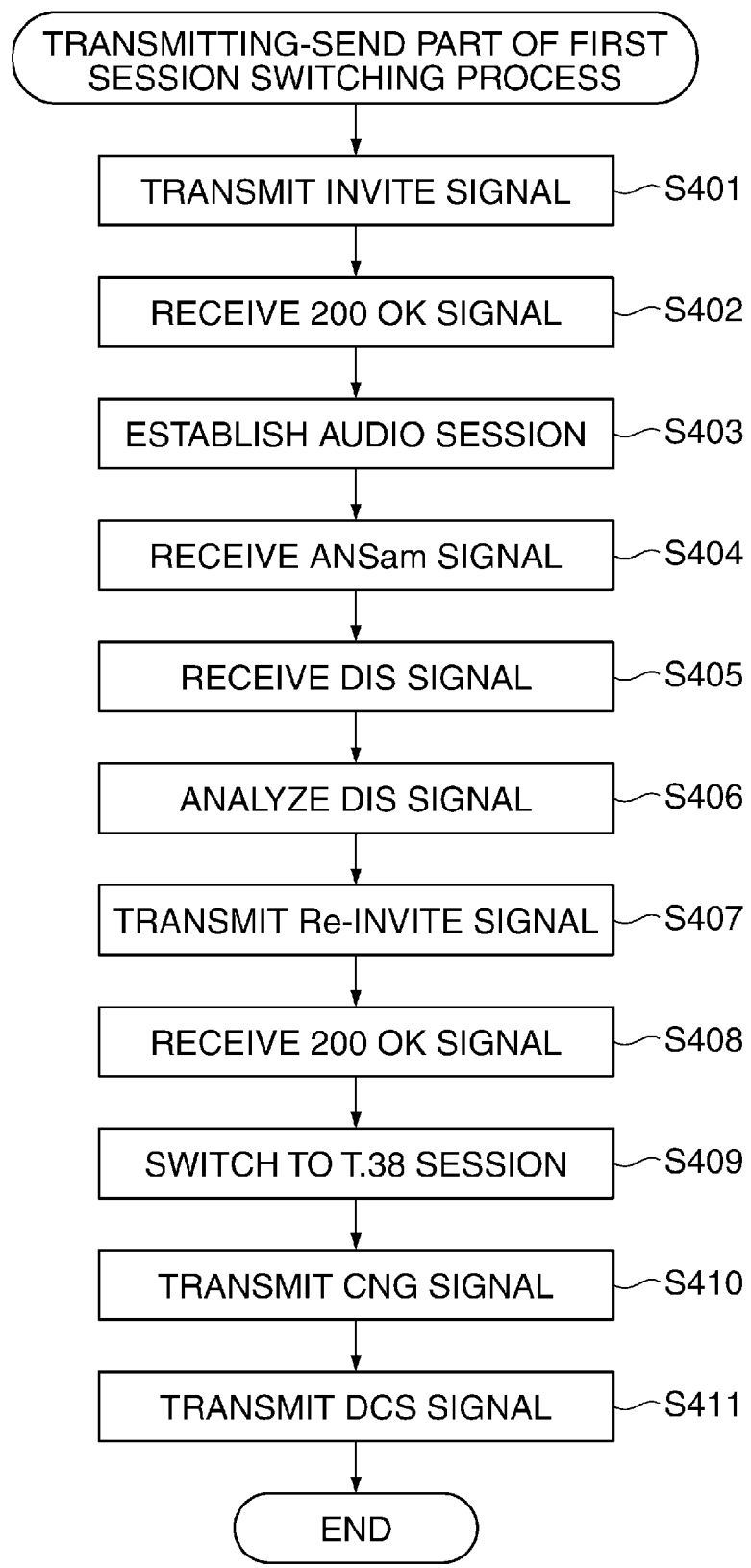
FIG. 4 is a flowchart of part of the first session switching process performed by an IP fax which is a transmitting-end apparatus in the first session switching process in FIG. 3.
Figure 5:
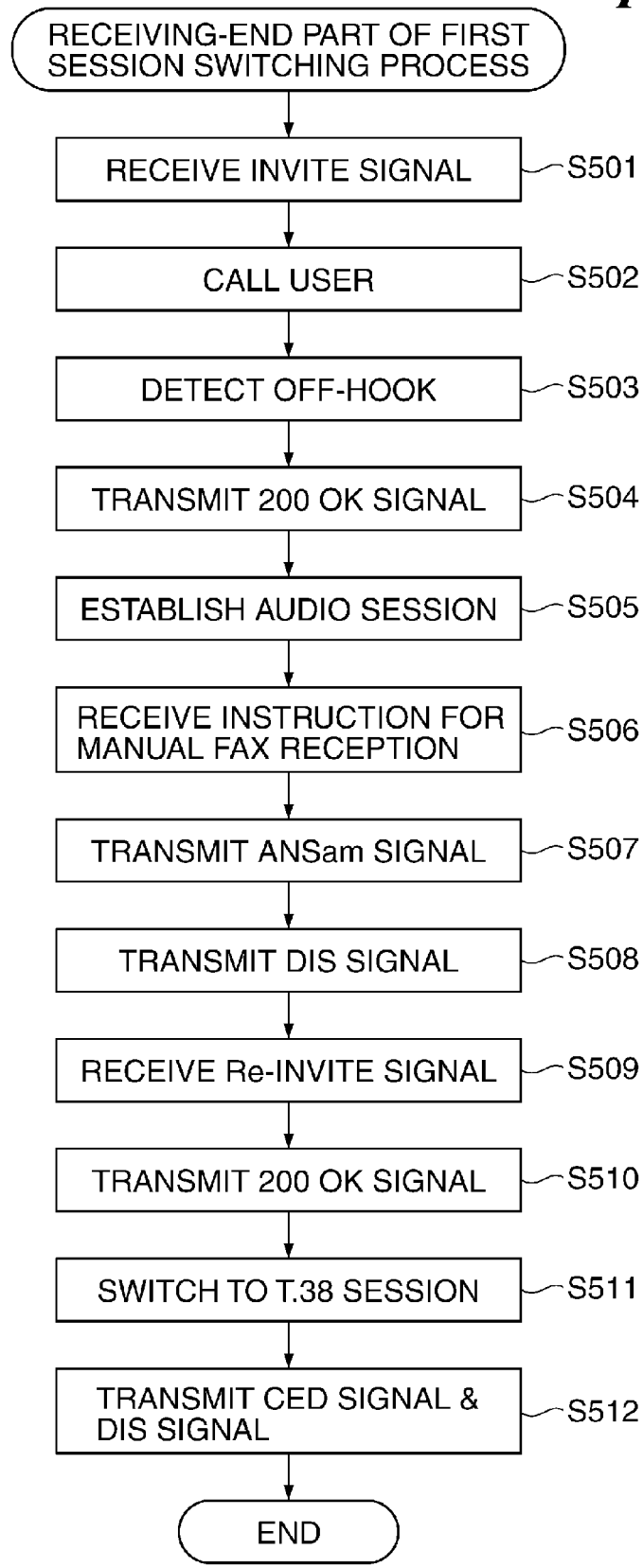
FIG. 5 is a flowchart of part of the first session switching process performed by an IP fax which is a receiving-end apparatus in the first session switching process.

FIG. 3 is a sequence diagram of a first session switching process performed between the IP faxes 101 and 102 appearing in FIG. 1. Further, FIG. 4 is a flowchart of part of the first session switching process performed by the IP fax 101 which is a transmitting-end apparatus in the first session switching process in FIG. 3. FIG. 5 is a flowchart of part of the first session switching process performed by the IP fax 102 which is a receiving-end apparatus in the first session switching process in FIG. 3.

Referring to FIGS. 3 to 5, first, the IP fax 101 (information processing apparatus) transmits to the IP fax 102 (other information processing apparatus) a signal requesting connection therefrom (hereinafter referred to as the "INVITE signal") in which the medium type is set to "audio", so as to establish an audio session (first session) with the IP fax 102 (steps S301 and S401). The IP fax 102 having received the INVITE signal causes the telephone set 221 to ring to thereby call a user (steps S302, and S501 and S502). When the SLIC 219 detects an off-hook state of the telephone set 221, the IP fax 102 transmits a response signal notifying acceptance of the request (hereinafter referred to as the "200 OK signal") to the IP fax 101 (steps S303, and S503 and S504), and the IP fax 101 receives the 200 OK signal (step S402). Then, the audio session is established between the IP faxes 101 and 102 (steps S304, S403, and S505).

Then, the IP fax 102 receives an instruction for executing manual fax reception (steps S305 and S506), transmits to the IP fax 101 a signal requesting fax transmission therefrom (hereinafter referred to as the "ANSam signal") (steps S306 and S507), and transmits a DIS signal (first signal) indicating that the IP fax 102 is an IAFD compatible with the communication protocol T.38 (steps S307 and S508). That is, the IP fax 102 transmits the DIS signal using the instruction received from the user for executing manual fax transmission, as a trigger.

The DIS signal is formed by a bit 3 indicating that the IP fax 102 is compatible with the communication protocol T.38 and a bit 123 indicating that the IP fax 102 is an IAFD. The DIS signal is periodically transmitted until fax communication between the IP fax 101 and the IP fax 102 is started. Further, the IP fax 102 having transmitted the DIS signal controls the IP fax 102 itself not to transmit a Re-INVITE signal. That is, the Re-INVITE signal (call signal) is not transmitted from the IP fax 102 having transmitted the DIS signal.

Then, the IP fax 101 receives the ANSam signal and the DIS signal, and analyzes the DIS signal (steps S308, and S404 to S406) to thereby confirm that the DIS signal is formed by the bit 3 and the bit 123. Then, the IP fax 101 transmits a Re-INVITE signal (second signal) to the IP fax 102 so as to switch the audio session to a T.38 session (second session) (steps S309 and S407). That is, the IP fax 101 transmits the Re-INVITE signal to the IP fax 102 using the DIS signal received from the IP fax 102 as a trigger. The IP fax 102 having received the Re-INVITE signal transmits a 200 OK signal to the IP fax 101 (steps S310, S509 and S510). After that, when the IP fax 101 receives the 200 OK signal (step S408), the audio session is switched to the T.38 session (steps S311, S409, and S511).

Then, the IP fax 101 transmits a CNG signal notifying fax transmission to the IP fax 102 (steps S312 and S410). The IP fax 102 transmits a CED signal as a response to the CNG signal, and the DIS signal, to the IP fax 101 (steps S313, S314, and S512). The IP fax 101 having received the DIS signal grasps various conditions, such as a receivable resolution and a modulation method for fax reception, which should be met for the IP fax 102 to receive a fax. Then, the IP fax 101 transmits a DCS signal to the IP fax 102 as a response to the DIS signal (steps S315 and S411). The IP fax 102 having received the DCS signal grasps specific conditions which should be met for a fax to be transmitted from the IP fax 101. After that, the IP faxes 101 and 102 start the fax communication (step S316), followed by terminating the present process.

According to the first session switching process described with reference to FIGS. 3 to 5, the IP fax 101 receives from the IP fax 102 the DIS signal indicating that no Re-INVITE signal requesting switching of the audio session to the T.38 session is transmitted from the IP fax 102 (steps S308 and S406). After receiving the DIS signal, the IP fax 101 transmits a Re-INVITE signal to the IP fax 102 (steps S309 and S407). This causes the audio session established between the IP fax 101 and the IP fax 102 to be switched to the T.38 session (steps S311, S408 and S409, and S511). That is, the Re-INVITE signal requesting switching of the audio session to the T.38 session is not transmitted from the IP fax 102. The Re-INVITE signal is transmitted from the IP fax 101 using the DIS signal received from the IP fax 102 as a trigger. Therefore, it is possible to avoid collision of a Re-INVITE signal transmitted from the IP fax 101 and a Re-INVITE signal transmitted from the IP fax 102, whereby it is possible to reliably switch the session.

Further, according to the first session switching process described with reference to FIGS. 3 to 5, after an instruction for executing manual fax reception has been received by the IP fax 102, the DIS signal notifying that the IP fax 102 is an IAFD compatible with the communication protocol T.38 is transmitted from the IP fax 102 to the IP fax 101. This makes it possible to prevent a Re-INVITE signal from being transmitted to the IP fax 102 before the IP fax 102 becomes ready for fax reception.

Note that in the first session switching process described with reference to FIGS. 3 to 5, IP faxes 101 and 102 both transmit a Re-INVITE signal. However, there is a case, for example, where an audio session is established between the IP fax 102 (receiving-end apparatus) that transmits a Re-INVITE signal and the IP fax 103 (transmitting-end apparatus) that does not transmit a Re-INVITE signal. In this case, assuming that the IP fax 102 transmits a DIS signal to the IP fax 103 after receiving an instruction for executing manual fax reception, similarly to the first session switching process described with reference to FIGS. 3 to 5, neither the IP fax 102 nor 103 transmits a Re-INVITE signal thereafter. Therefore, it is impossible to realize high-speed fax communication by switching the audio session to the T.38 session. To overcome this problem, the IP fax 102 is provided with a switch for transmitting a Re-INVITE signal without transmitting a DIS signal (hereinafter referred to as the "transmission switching switch"). That is, when the IP fax 102 and the IP fax 103 are connected to each other, the IP fax 102 may transmit a Re-INVITE signal by turning on the transmission switching switch. A session switching process using the transmission switching switch will be described in detail with reference to FIG. 6.

Figure 6:
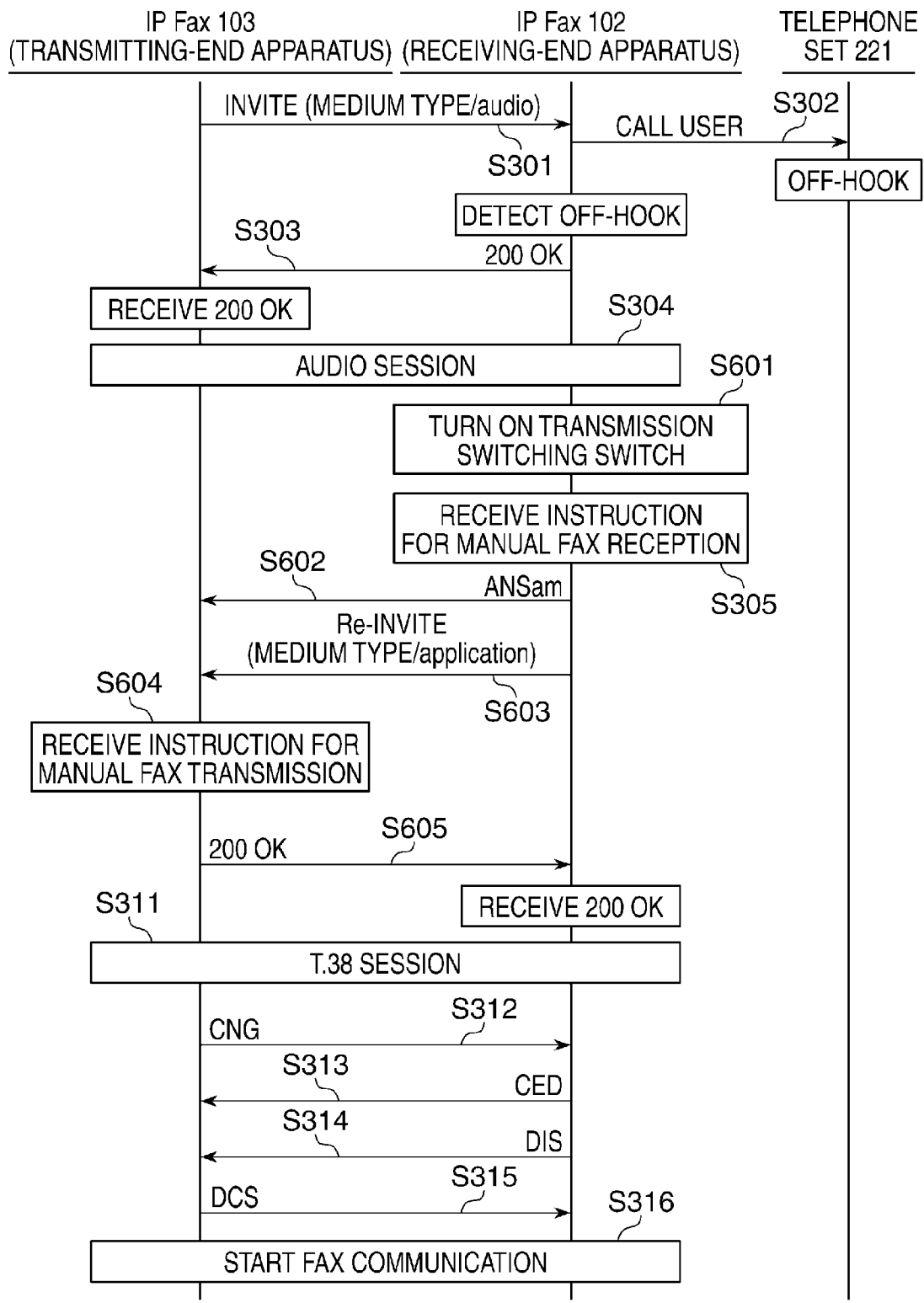
FIG. 6 is a sequence diagram of a second session switching process performed between IP faxes.

FIG. 6 is a sequence diagram of a second session switching process performed between the IP faxes 102 and 103 appearing in FIG. 1. The second session switching process described with reference to FIG. 6 differs from the first session switching process in FIG. 3 in that the IP fax 103 that does not transmit a Re-INVITE signal is used in place of the IP fax 101, and the IP fax 102 is provided with the transmission switching switch. Further, the steps S301 to S305, and S311 to S316 in FIG. 6 are the same as the steps S301 to S305 and S311 to S316 in FIG. 3, and hence the following description will be given only of different points from FIG. 3.

Referring to FIG. 6, when the audio session is established (step S304), the IP fax 102 turns on the transmission switching switch (step S601). After that, the IP fax 102 receives an instruction for executing manual fax reception (step S305), and transmits an ANSam signal and a Re-INVITE signal to the IP fax 103 (steps S602 and S603). The IP fax 103 judges that the instruction for executing manual fax transmission has been received from the user based on a fact that the Re-INVITE signal has been received (step S604). Then, the IP fax 103 judges that it is ready for switching the audio session to the T.38 session, and transmits a 200 OK signal to the IP fax 102 (step S605). When the IP fax 102 receives the 200 OK signal, the audio session is switched to the T.38 session (step S311), and then the steps S312 et seq. are executed.

Next, a description will be given of a second embodiment of the present invention.

The second embodiment is basically the same in configuration and operation as the above-described first embodiment. The second embodiment differs from the first embodiment in that an IP fax having received a Re-INVITE signal is in a state incapable of immediately switching the audio session to the T.38 session. The redundant description of the same configuration and operation as those of the first embodiment is omitted, and the following description will be given only of different points thereof.

Figure 7:
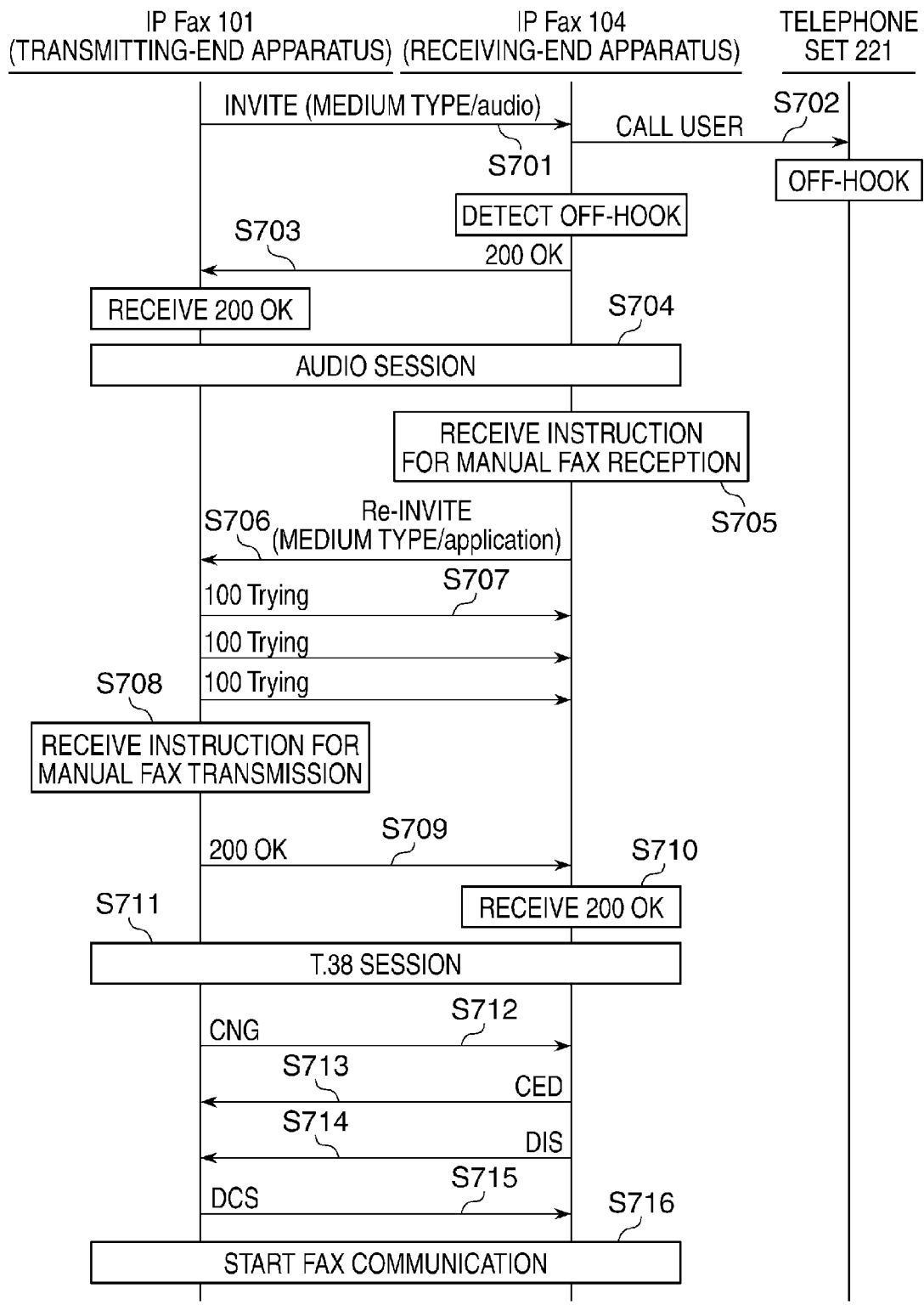
FIG. 7 is a sequence diagram of a third session switching process performed between IP faxes.
Figure 8:
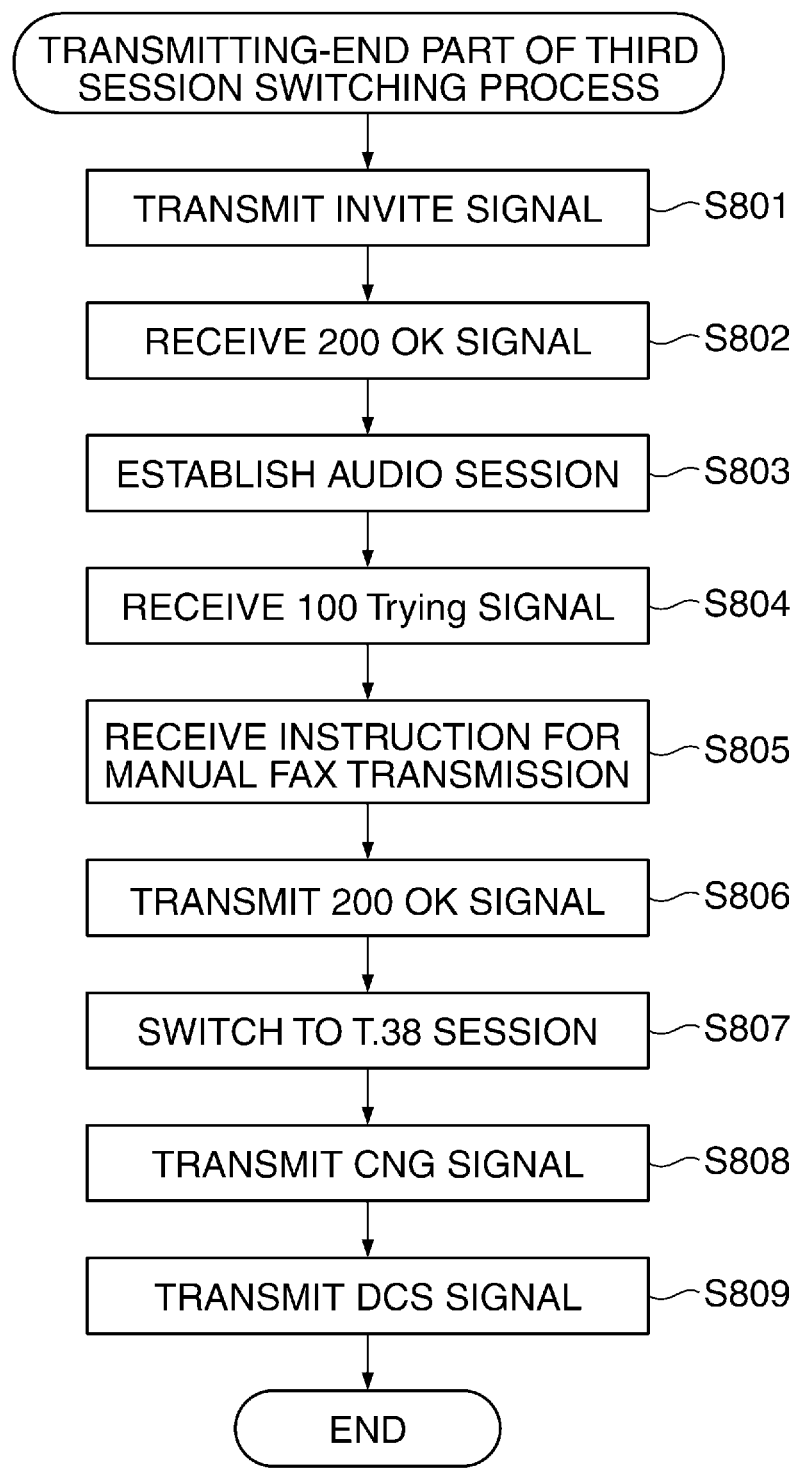
FIG. 8 is a flowchart of part of the third session switching process performed by an IP fax which is a transmitting-end apparatus in the third session switching process in FIG. 7.
Figure 9:
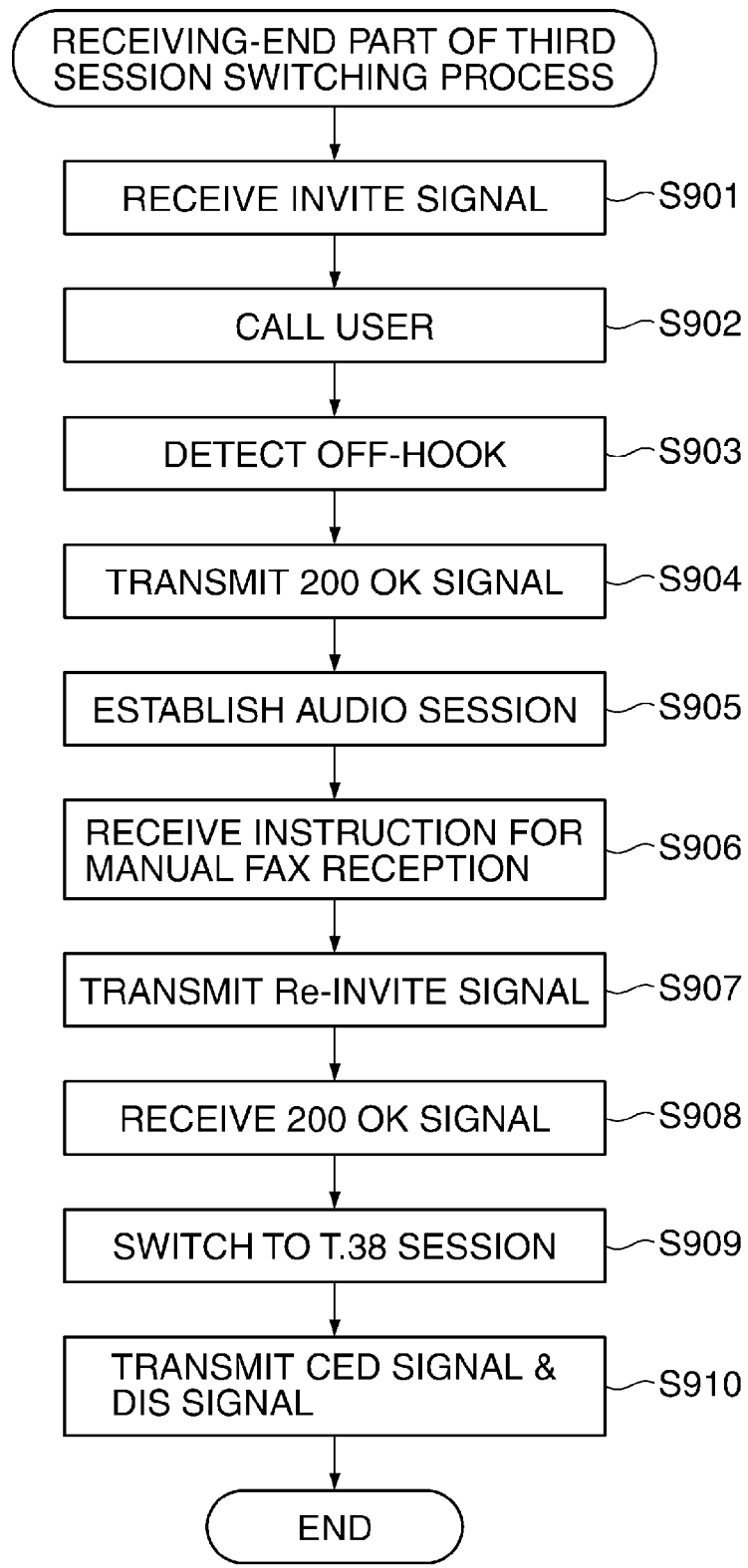
FIG. 9 is a flowchart of part of the third session switching process performed by an IP fax which is a receiving-end apparatus in the third session switching process.

FIG. 7 is a sequence diagram of a third session switching process performed between the IP faxes 101 and 104, appearing in FIG. 1. Further, FIG. 8 is a flowchart of part of the third session switching process performed by the IP fax 101 which is a transmitting-end apparatus in the third session switching process in FIG. 7. FIG. 9 is a flowchart of part of the third session switching process performed by the IP fax 104 which is a receiving-end apparatus in the third session switching process in FIG. 7.

Referring to FIGS. 7 to 9, first, the IP fax 101 (information processing apparatus) transmits an INVITE signal to the IP fax 104 (other information processing apparatus) so as to establish an audio session (first session) with the IP fax 104 (steps S701 and S801). The IP fax 104 having received the INVITE signal causes the telephone set 221 to ring to thereby call a user (steps S702, and S901 and S902). When the SLIC 219 detects an off-hook state of the telephone set 221, the IP fax 104 transmits a 200 OK signal to the IP fax 101 (steps S703, and S903 and S904), and the IP fax 101 receives the 200 OK signal (step S802). Then, the audio session is established between the IP faxes 101 and 104 (steps S704, S803, and S905).

Then, the IP fax 104 receives an instruction for executing manual fax reception (steps S705 and S906). In the following steps S706 and S907, the IP fax 104 requests the IP fax 101 to switch the audio session established between the IP faxes 101 and 104 to a T.38 session (second session). More specifically, the IP fax 104 transmits a Re-INVITE signal (first signal) to the IP fax 101.

Here, there is a case where the audio session cannot be immediately canceled because predetermined processing, i.e. IP phone conversation is being performed by the IP fax 101 during the audio session established between the IP faxes 101 and 104. In this case, if the IP fax 101 having received the Re-INVITE signal sends a response notifying that the session cannot be switched to the IP fax 104, this may cause a situation where the session between the IP faxes 101 and 104 cannot be switched thereafter. To avoid this inconvenience, the IP fax 101 having received the Re-INVITE signal does not send a response notifying that the session cannot be switched, to the IP fax 104. Instead of this, the IP fax 101 transmits, as a response to the received Re-INVITE signal, a signal notifying that a session switching request has been received (hereinafter referred to as the "100 Trying signal") (steps S707 and S804). The 100 Trying signal (second signal) is periodically transmitted after reception of the Re-INVITE signal by the IP fax 101, until fax communication is started between the IP faxes 101 and 104.

Then, when the IP fax 101 terminates the predetermined processing and is ready for switching the audio session to the T.38 session, the IP fax 101 performs the following process: The IP fax 101 judges that the instruction for executing manual fax transmission has been received from the user based on a fact that the Re-INVITE signal has been received (steps S708 and S805), and transmits a 200 OK signal to the IP fax 104 (steps S709 and S806). When the IP fax 104 receives the 200 OK signal (steps S710 and S908), the audio session is switched to the T.38 session (steps S711, S807, and S909).

Then, the IP fax 101 transmits a CNG signal notifying fax transmission to the IP fax 104 (steps S712 and S808). The IP fax 104 transmits a CED signal as a response to the CNG signal, and a DIS signal, to the IP fax 101 (steps S713 and S714, and S910). After that, the IP fax 101 having received the DIS signal grasps various conditions which should be met for the IP fax 104 to receive a fax. Then, the IP fax 101 transmits a DCS signal to the IP fax 104 as a response to the DIS signal (steps S715 and S809). The IP fax 104 having received the DCS signal grasps specific conditions which should be met for a fax to be transmitted from the IP fax 101, and the IP faxes 101 and 104 start the fax communication (step S716), followed by terminating the present process.

According to the third session switching process described with reference to FIGS. 7 to 9, the IP fax 104 transmits to the IP fax 101 a Re-INVITE signal requesting switching of the audio session established between the IP faxes 101 and 104 to the T.38 session (step S706). The IP fax 101 transmits, as a response to the received Re-INVITE signal, a 100 Trying signal notifying that a session switching request has been received, during execution of predetermined processing (step S707). Then, when the IP fax 101 terminates the predetermined processing and is ready for switching the audio session to the T.38 session (step S709), the audio session is switched to the T.38 session (step S711). This eliminates the need of sending, from the IP fax 101 having received the Re-INVITE signal, a response notifying that the session cannot be switched, to the IP fax 104. This makes it possible to avoid a situation where the session between the IP fax 101 and the IP fax 104 cannot be switched.

Figure 10:
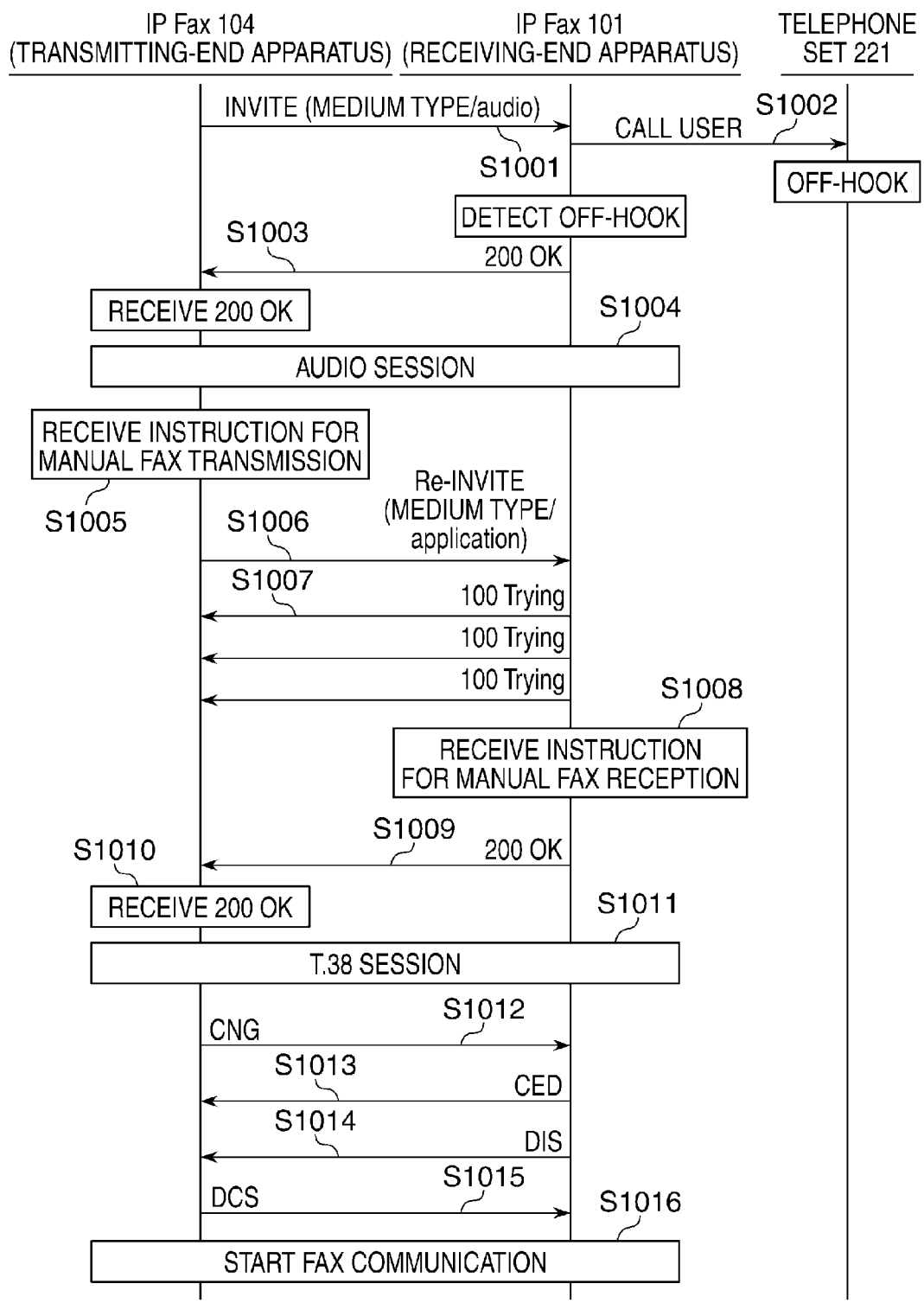
FIG. 10 is a sequence diagram of a variation of the third session switching process in FIG. 7.
Figure 11:
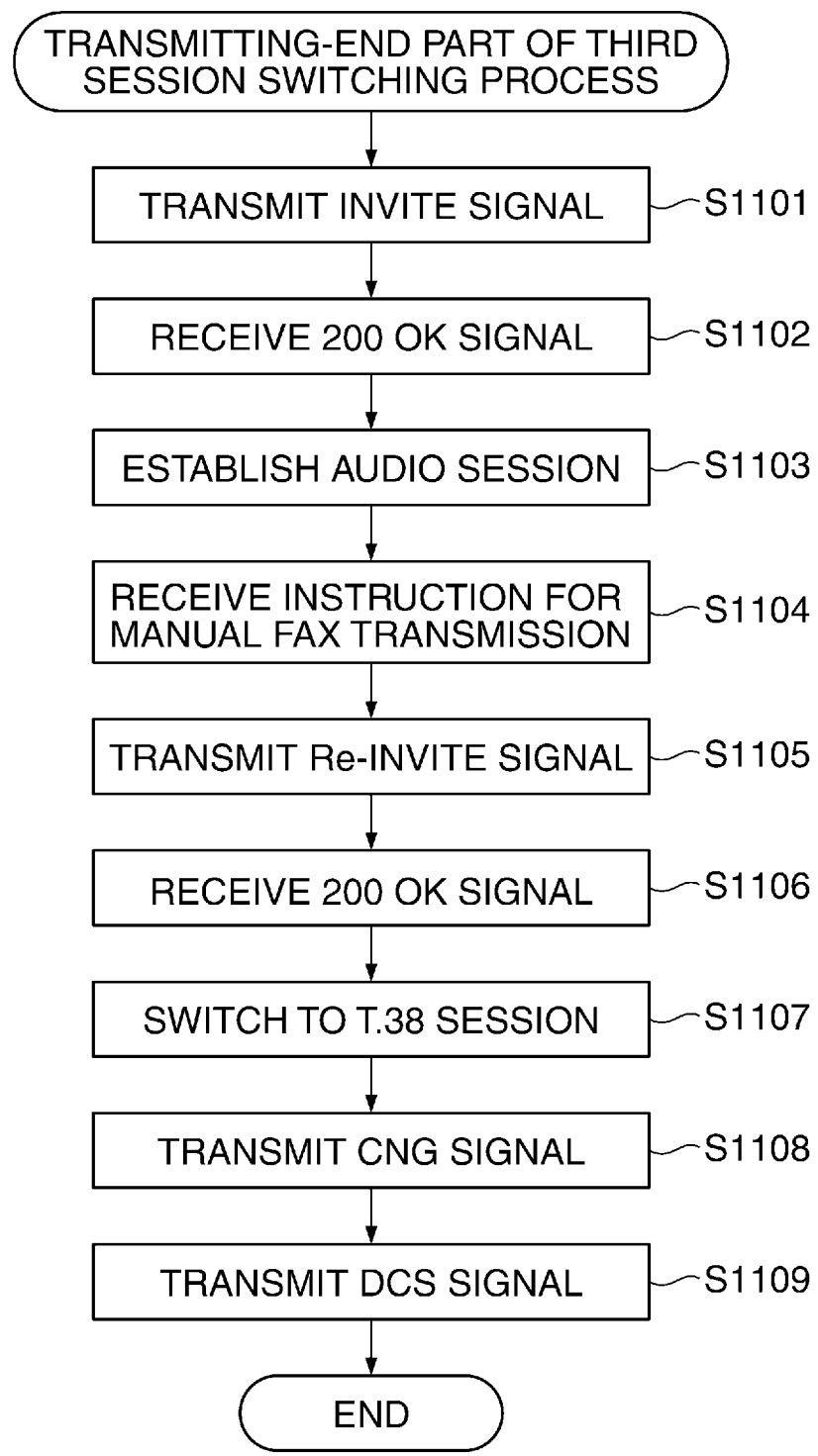
FIG. 11 is a flowchart of part of a variation of the third session switching process performed by an IP fax which is a transmitting-end apparatus in the variation of the third session switching process in FIG. 10.
Figure 12:
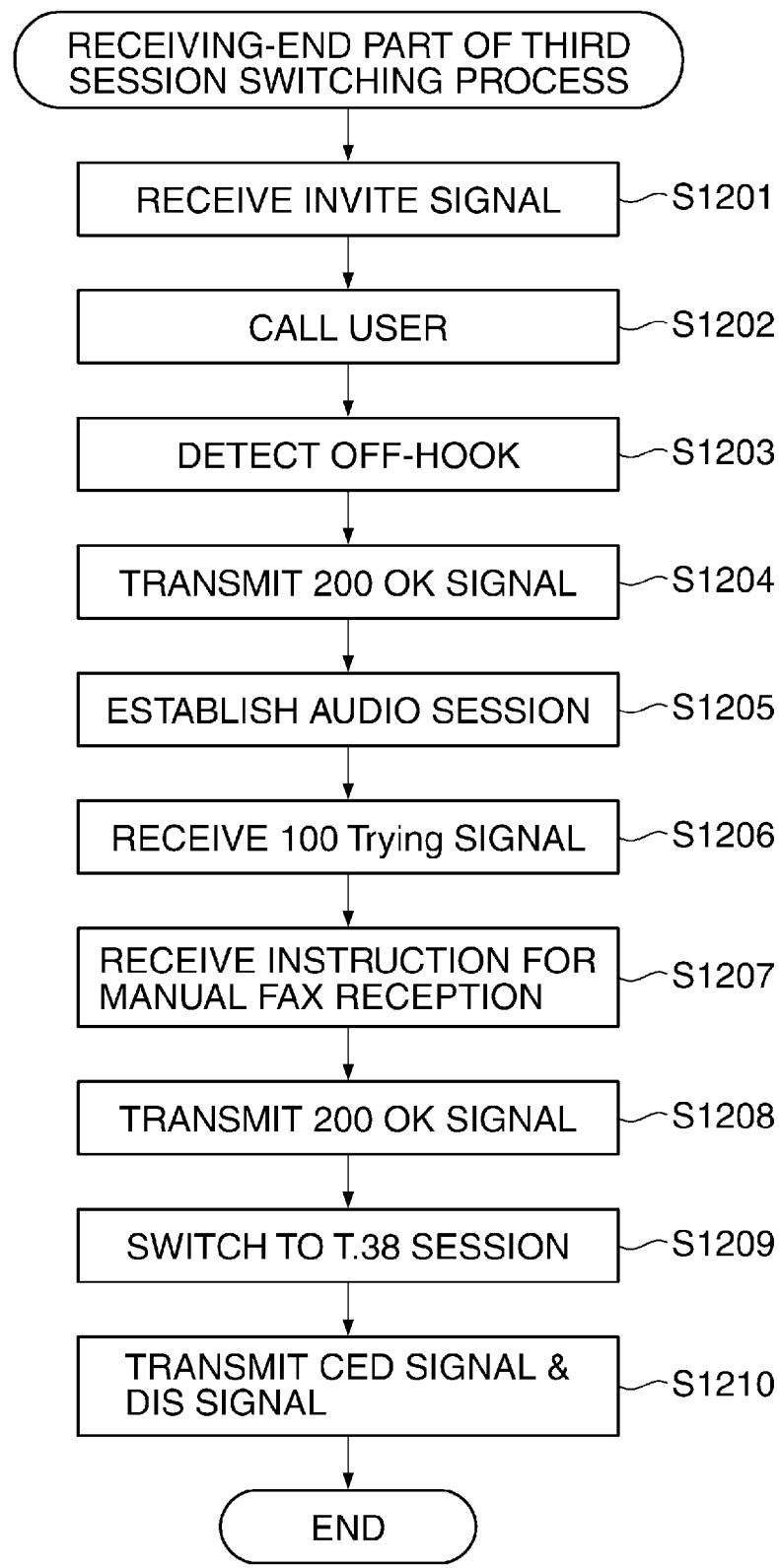
FIG. 12 is a flowchart of part of the variation of the third session switching process performed by an IP fax which is a receiving-end apparatus in the variation of the third session switching process.

FIG. 10 is a sequence diagram of a variation of the third session switching process in FIG. 7. FIG. 11 is a flowchart of part of the variation of the third session switching process performed by the IP fax 104 which is a transmitting-end apparatus in the variation of the third session switching process in FIG. 10. FIG. 12 is a flowchart of part of the variation of the third session switching process performed by the IP fax 101 which is a receiving-end apparatus in the variation of the third session switching process in FIG. 10.

In the third session switching process described with reference to FIGS. 7 to 9, the description has been given of the processing for switching the audio session established between the IP fax 101 as the transmitting-end apparatus and the IP fax 104 as the receiving-end apparatus, to the T.38 session. In the variation of the third session switching process described hereafter with reference to FIGS. 10 to 12, a description will be given of processing for switching the audio session established between the IP fax 104 as a transmitting-end apparatus and the IP fax 101 as a receiving-end apparatus, to the T.38 session.

Further, in the variation of the third session switching process described with reference to FIGS. 10 to 12, similarly to the third session switching process described with reference to FIGS. 7 to 9, the IP fax 101 is executing predetermined processing when the IP fax 101 receives a Re-INVITE signal from the IP fax 104. Therefore, it is assumed that the session cannot be immediately switched from the audio session to the T.38 session.

Referring to FIGS. 10 to 12, first, to establish an audio session with the IP fax 101, the IP fax 104 (transmitting-end apparatus) transmits an INVITE signal to the IP fax 101 (receiving-end apparatus) (steps S1001 and S1101). Then, the IP fax 101 having received the INVITE signal causes the telephone set 221 to ring to thereby call a user (steps S1002, and S1201 and S1202). When the SLIC 219 detects an off-hook state of the telephone set 221, the IP fax 101 transmits a 200 OK signal to the IP fax 104 (steps S1003, and S1203 and S1204). Thereafter, the IP fax 104 receives the 200 OK signal (step S1102), and an audio session is established between the IP faxes 104 and 101 (steps S1004, S1103, and S1205).

Then, the IP fax 104 receives an instruction for executing manual fax transmission (steps S1005 and S1104). After that, the IP fax 104 transmits to the IP fax 101 a Re-INVITE signal requesting switching of the audio session established between the IP faxes 104 and 101 to a T.38 session (steps S1006 and S1105). Here, the IP fax 101 having received the Re-INVITE signal is executing the predetermined processing, and hence the audio session cannot be immediately canceled. In response to the Re-INVITE signal, the IP fax 101 does not send to the IP fax 104 a response notifying that the session cannot be switched. Instead of this, the IP fax 101 transmits, as a response to the Re-INVITE signal, a 100 Trying signal notifying that a session switching request has been received (steps S1007 and S1206). The 100 Trying signal is periodically transmitted during execution of the predetermined processing by the IP fax 101 i.e. until the fax communication between the IP fax 104 and the IP fax 101 is started.

Then, in the following steps S1008 and S1207, when the IP fax 101 terminates the predetermined processing and is ready for switching the audio session to the T.38 session, the IP fax 101 receives an instruction for executing manual fax reception from the user. Then, the IP fax 101 transmits a 200 OK signal to the IP fax 104 (steps S1009 and S1208). When the IP fax 104 receives the 200 OK signal (steps S1010 and S1106), the audio session is switched to the T.38 session (steps S1011, S1107, and S1209).

Then, the IP fax 104 transmits a CNG signal notifying fax transmission to the IP fax 101 (steps S1012 and S1108). The IP fax 101 transmits a CED signal as a response to the CNG signal, and a DIS signal, to the IP fax 104 (steps S1013 and S1014, and S1210). The IP fax 104 having received the DIS signal grasps various conditions which should be met for the IP fax 101 to receive a fax. Then, the IP fax 104 transmits a DCS signal to the IP fax 101 as a response to the DIS signal (steps S1015 and S1109). The IP fax 101 having received the DCS signal grasps specific conditions which should be met for a fax to be transmitted from the IP fax 104, and the IP faxes 104 and 101 start the fax communication (step S1016), followed by terminating the present process.

According to the variation of the third session switching process described with reference to FIGS. 10 to 12, it is possible to obtain the same advantageous effects provided by the third session switching process described with reference to FIGS. 7 to 9.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-082395 filed Apr. 14, 2015, which is hereby incorporated by reference herein in its entirety.

What is claimed is:

1. An information processing apparatus comprising:
a memory; and
a processor connected to the memory and configured to execute:
an establishing task configured to establish a first session with another information processing apparatus by transmitting INVITE to the other information processing apparatus;
a reception task configured to receive capability information indicating capabilities of the other information processing apparatus from the other information processing apparatus, after the establishing task establishes the first session;
a request task configured to request the other information processing apparatus to switch the first session to a second session, after the reception task receives the capability information, by transmitting Re-INVITE to the other information processing apparatus; and
a switching task configured to switch the first session to the second session after the request task requests the other information processing apparatus to switch the first session to the second session.

2. The information processing apparatus according to claim 1, wherein when the other information processing apparatus receives an instruction for executing manual fax reception, the reception task receives the capability information from the other information processing apparatus.

3. The information processing apparatus according to claim 1 wherein the capability information is DIS.

4. The information processing apparatus according to claim 1 wherein the first session is an audio session.

5. The information processing apparatus according to claim 1 wherein the second session is an application session.

6. The information processing apparatus according to claim 1 wherein the second session is a T.38 session.

7. A method of controlling an information processing apparatus comprising:
establishing a first session with another information processing apparatus by transmitting INVITE to the other information processing apparatus;
receiving capability information indicating capabilities of the other information processing apparatus from the other information processing apparatus, after establishing the first session;
requesting the other information processing apparatus to switch the first session to a second session, after receiving the capability information, by transmitting Re-INVITE to the other information processing apparatus; and
switching the first session to the second session after requesting the other information processing apparatus to switch the first session to the second session.

8. A non-transitory computer-readable storage medium storing a computer-executable control program for causing a computer to execute a method of controlling an information processing apparatus, wherein the method comprises:
establishing a first session with another information processing apparatus by transmitting INVITE to the other information processing apparatus;
receiving capability information indicating capabilities of the other information processing apparatus from the other information processing apparatus, after establishing the first session;
requesting the other information processing apparatus to switch the first session to a second session, after receiving the capability information, by transmitting Re-INVITE to the other information processing apparatus; and
switching the first session to the second session after requesting the other information processing apparatus to switch the first session to the second session.

9. A facsimile apparatus comprising:
a memory; and
a processor connected to the memory and configured to execute:
a first request task configured to request another facsimile apparatus to establish an audio session by transmitting INVITE to the other facsimile apparatus;
an establishing task configured to establish the audio session with the other facsimile apparatus based on a first response from the other facsimile apparatus to the INVITE;
a reception task configured to receive capability information indicating whether the other facsimile apparatus is compatible with a T.38 protocol from the other facsimile apparatus, after the establishing task establishes the audio session;
a second request task configured to request the other facsimile apparatus to switch the audio session to a T.38 session, based on the received capability information, by transmitting Re-INVITE to the other facsimile apparatus; and
a switching task configured to switch the audio session to the T.38 session based on a second response from the other facsimile apparatus to the Re-INVITE.

10. The facsimile apparatus according to claim 9, wherein the capability information is transmitted from the other facsimile apparatus when the other facsimile apparatus receives an instruction for executing fax reception.

11. The facsimile apparatus according to claim 9, wherein the second response to the Re-INVITE is 200OK.

12. The facsimile apparatus according to claim 9, wherein an IP facsimile communication is performed between the facsimile apparatus and the other facsimile apparatus after the switching task switches the audio session to the T.38 session.

13. A method of controlling a facsimile apparatus, the method comprising:
requesting another facsimile apparatus to establish an audio session by transmitting INVITE to the other facsimile apparatus;
establishing the audio session with the other facsimile apparatus based on a first response from the other facsimile apparatus to the INVITE;
receiving capability information indicating whether the other facsimile apparatus is compatible with a T.38 protocol from the other facsimile apparatus, after establishing the audio session;
requesting the other facsimile apparatus to switch the audio session to a T.38 session, based on the received capability information, by transmitting Re-INVITE to the other facsimile apparatus; and switching the audio session to the T.38 session based on a second response from the other facsimile apparatus to the Re-INVITE.

14. The method according to claim 13, wherein the capability information is transmitted from the other facsimile apparatus when the other facsimile apparatus receives an instruction for executing fax reception.

15. The method according to claim 13, wherein the second response to the Re-INVITE is 200OK.

16. The method according to claim 13, further including performing an IP facsimile communication between the facsimile apparatus and the other facsimile apparatus after switching the audio session to the T.38 session.

17. A non-transitory computer-readable storage medium storing a computer-executable control program for causing a computer to execute a method of controlling a facsimile apparatus, the method comprising:

requesting another facsimile apparatus to establish an audio session by transmitting INVITE to the other facsimile apparatus;

establishing the audio session with the other facsimile apparatus based on a first response from the other facsimile apparatus to the INVITE;

receiving capability information indicating whether the other facsimile apparatus is compatible with a T.38 protocol from the other facsimile apparatus, after establishing the audio session;

requesting the other facsimile apparatus to switch the audio session to a T.38 session, based on the received capability information, by transmitting Re-INVITE to the other facsimile apparatus; and switching the audio session to the T.38 session based on a second response from the other facsimile apparatus to the Re-INVITE.

18. The computer-readable storage medium according to claim 17, wherein the capability information is transmitted from the other facsimile apparatus when the other facsimile apparatus receives an instruction for executing fax reception.

19. The computer-readable storage medium according to claim 17, wherein the second response to the Re-INVITE is 200OK.

20. the computer-readable storage medium according to claim 17, wherein the method further includes performing an IP facsimile communication between the facsimile apparatus and the other facsimile apparatus after switching the audio session to the T.38 session.

* * * * *